United States Patent

Nagaoka

[11] Patent Number: 5,883,184
[45] Date of Patent: Mar. 16, 1999

[54] CURABLE ORGANOSILOXANE COMPOSITION

[75] Inventor: Hisayuki Nagaoka, Tokyo, Japan

[73] Assignee: Toshiba Silicone Co., Ltd., Tokyo, Japan

[21] Appl. No.: 650,962

[22] Filed: May 21, 1996

Related U.S. Application Data

[63] Continuation of Ser. No. 487,635, Jun. 7, 1995, abandoned, which is a continuation of Ser. No. 361,447, Dec. 21, 1994, abandoned, which is a continuation of Ser. No. 201,314, Feb. 24, 1994, abandoned.

[30] Foreign Application Priority Data

Nov. 4, 1993 [JP] Japan .................................. 5-275538

[51] Int. Cl.$^6$ ..................................... C08K 3/14
[52] U.S. Cl. ........................ 524/788; 523/210; 523/212; 524/862; 524/789; 524/771; 524/733; 524/791; 524/714; 524/588; 524/448; 524/425; 524/35; 524/450; 524/361; 524/236; 524/315
[58] Field of Search ..................... 523/210, 212; 524/862, 789, 788, 733, 791, 771, 714, 588, 448, 425, 35, 450, 361, 236, 315

[56] References Cited

U.S. PATENT DOCUMENTS

| | | | |
|---|---|---|---|
| 4,304,697 | 12/1981 | Agarwal et al. | 260/27 BB |
| 4,347,333 | 8/1982 | Lohr et al. | 524/269 |
| 4,454,262 | 6/1984 | Fukayama et al. | 523/210 |
| 4,544,696 | 10/1985 | Streusand et al. | 524/862 |
| 4,732,931 | 3/1988 | Maxson | 524/862 |

*Primary Examiner*—Karen A. Dean
*Attorney, Agent, or Firm*—Sughrue, Mion, Zinn, Macpeak & Seas, PLLC

[57] ABSTRACT

A curable organopolysiloxane composition is disclosed, comprising (A) 100 parts by weight of an organopolysiloxane having at least two monovalent aliphatic unsaturated hydrocarbon groups bonded to the silicon atoms per molecule, (B) an organopolyhydrogensiloxane having at least three hydrogen atoms bonded to the silicon atoms per molecule in such an amount that the number of the hydrogen atoms bonded to the silicon atoms falls within a range of from 0.25 to 8 per monovalent aliphatic unsaturated hydrocarbon group in component (A), (C) a catalyst selected from the group consisting of platinum and platinum compounds in an amount of from 0.1 to 500 ppm in terms of metallic platinum based on the weight of the component (A), and (D) from 1 to 650 parts by weight of an oil-absorbing filler which has been prepared by impregnating (a) a porous filler with from 1% by weight based on the porous filler up to a saturation amount of (b) a volatile organic compound which is incompatible or partly compatible with component (A) and compatible with an organic oily substance. The composition exhibits satisfactory adhesion to a substrate in such adhesion operation as an FIPG system without requiring wiping of organic oily contaminants on the substrate, such as hydrocarbon oils, e.g., a rust preventing oil and an engine oil.

6 Claims, 1 Drawing Sheet

CURABLE ORGANOSILOXANE COMPOSITION

This is a continuation of application Ser. No. 08/487,635 filed Jun. 7, 1995 now abandoned, which is a continuation of application Ser. No. 08/361,447 filed Dec. 21, 1994 now abandoned, which is a continuation of Ser. No. 08/201,314 filed Feb. 24, 1994 now abandoned.

FILED OF THE INVENTION

This invention relates to an organopolysiloxane composition and more particularly a curable organopolysiloxane composition containing an oil-absorbing filler having been subjected to a specific treatment and thereby exhibiting good adhesion to a substrate with its surface contaminated with organic oily substances, such as hydrocarbon oils including a rust preventing oil and an engine oil, and therefore particularly useful as a sealing compound for forming a gasket in place.

BACKGROUND OF THE INVENTION

As the demand for heat resistance of materials to be used in automobile engines increases, gaskets made of silicone rubber have been broadly used for sealing of an engine and its surroundings. In particular, formed-in-place gaskets (hereinafter referred to as "FIPG") made from a curable liquid silicone rubber have been replacing conventional cut-to-size gaskets for ease of inventory control of gaskets, ease of process control in production of engines, and high reliability of sealing performance. The advantages of the FIPG system in workability, heat resistance, and the like are now highly appreciated.

Since the engine parts to be sealed are often contaminated with organic oily substances such as hydrocarbon oils, animal or vegetable oils, and synthetic oils as in the case that a rust preventing oil is applied or that the parts are dipped in an engine oil for smooth assembly, the oily contaminants must be wiped off the surface with a cloth, etc., before FIPG sealing. However, since the organic oily substances, such as hydrocarbon oils, are not completely removed, the parts cannot be sealed completely. For example, should an oil pan with its surface contaminated be sealed by an FIPG system, cases are sometimes met with in which such troubles as leakage of an engine oil occurs in use. Further, while an FIPG sealing compound is automatically coated by means of a robot, the above-described wiping operation with a cloth is manually conducted, which has been a bar to automation of a series of operations.

In order to solve these problems, WO 88/05798 (unexamined published international patent application) discloses an adhesive comprising a room temperature-curable organopolysiloxane composition and an oxime(alkoxy)silylalkylurea compound as a fixing agent. Further, JP-A-5-98160 (unexamined published Japanese patent application) discloses an adhesive composition for adhesion to an oil-contaminated surface which comprises the same condensation reaction type organopolysiloxane composition as used in WO 88/500178 and an oil-absorbing carbon powder. However, these compositions still fail to achieve adhesion to an oil-contaminated surface to a satisfactory degree.

Besides the above-described condensation reaction type compositions, addition reaction type organopolysiloxane compositions have been proposed which cure in a short time on heating through addition reaction between an alkenyl group bonded to the silicon atom and an Si—H bond and exhibit excellent deep cure. The organopolysiloxane composition used here generally shows no adhesion by itself but is made into an addition reaction type organopolysiloxane composition having adhesiveness to various substrates by incorporation of an organic amine compound having a vinyl group, a methacryloyl group, an ester linkage, an alkoxy group, in the molecule thereof. The adhesive composition of this type has been widely used as an FIPG compound in places where heat curing is permitted or as an FIPG compound which is used in such a manner that the compound is applied to one element and, after curing, another element is fitted thereto, followed by compression. However, none of the known adhesive addition reaction type organopolysiloxane compositions exhibit excellent adhesion to an oil-contaminated surface.

SUMMARY OF THE INVENTION

An object of the present invention is to provide an addition reaction type curable organopolysiloxane composition which exhibits satisfactory adhesion to a substrate whose surface is contaminated with organic oily substances, such as a hydrocarbon oil, e.g., a rust preventing oil or an engine oil, without requiring a wiping operation even in an FIPG sealing system.

Another object of the present invention is to provide a method for adhering to an oil-contaminated surface of a substrate without wiping the surface clean.

As a result of extensive investigations, the present inventors have found that an oil-absorbing filler prepared by impregnating a porous filler with a volatile organic compound having more selective compatibility to an organic oily substance than an organopolysiloxane, when compounded into an addition reaction type curable organopolysiloxane composition, provides a composition having satisfactory adhesion even to an oil-contaminated surface of a substrate, thus meeting the above-described objects. The present invention has been completed based on this finding.

The present invention relates to a curable organopolysiloxane composition comprising (A) 100 parts by weight of an organopolysiloxane having at least two monovalent aliphatic unsaturated hydrocarbon groups bonded to the silicon atoms per molecule, (B) an organopolyhydrogensiloxane having at least three hydrogen atoms bonded to the silicon atom per molecule in such an amount that the number of the hydrogen atoms bonded to the silicon atoms falls within a range of from 0.25 to 8 per monovalent aliphatic unsaturated hydrocarbon group in component (A), (C) a catalyst selected from the group consisting of platinum and platinum compounds in an amount of from 0.1 to 500 ppm in terms of metallic platinum based on the weight of component (A), and (D) from 1 to 650 parts by weight of an oil-absorbing filler which has been prepared by impregnating (a) a porous filler with from 1% by weight based on the weight of the porous filler up to a saturation amount of (b) a volatile organic compound which is incompatible or partly compatible with component (A) and compatible with an organic oily substance.

BRIEF DESCRIPTION OF THE DRAWING

The attached Figure is a perspective view showing a specimen used in Examples for a shearing adhesion test. Numerals 1 and 2 are adherends made of aluminum and steel, respectively; 3 is an engine oil-applied surface; and 4 is an organopolysiloxane composition.

DETAILED DESCRIPTION OF THE INVENTION

Figure 1:
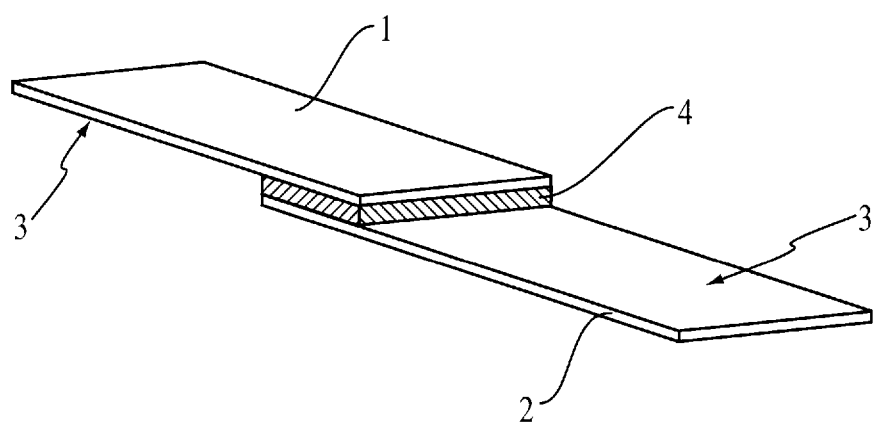

Component (A) is an organopolysiloxane having two or more monovalent aliphatic unsaturated hydrocarbon groups bonded to the silicon atoms per molecule and capable of forming a network structure on addition reaction and serves as a base polymer of the composition according to the present invention. Component (A) is not particularly limited so long as the above conditions are fulfilled.

The monovalent aliphatic unsaturated hydrocarbon groups include a vinyl group, an allyl group, a 1-butenyl group, and a 1-hexenyl group. A vinyl group is the most advantageous in that an organopolysiloxane having a vinyl group is easy to synthesize and does not impair fluidity of the curable composition or heat resistance of a cured product.

Other organic groups bonded to the silicon atoms of component (A) include alkyl groups, e.g., a methyl group, an ethyl group, a propyl group, a butyl group, a pentyl group, a hexyl group, an octyl group, a decyl group, and a dodecyl group; aryl groups, e.g., a phenyl group; aralkyl groups, e.g., a benzyl group, a 2-phenylethyl group, and a 2-phenylpropyl group; and substituted hydrocarbon groups, e.g., a chloromethyl group, a chlorophenyl group, a 2-cyanoethyl group, and a 3,3,3-trifluoropropyl group. From the standpoint of ease of synthesis and well-balanced characteristics, such as mechanical strength of a cured product and fluidity before curing, a methyl group is the most preferred. Organic groups other than a methyl group may also be selected arbitrarily. It is recommended, however, to use a phenyl group as part of the organic groups when a cured rubbery product is required to have cold resistance or heat resistance, and to use a 3,3,3-trifluoropropyl group as part of the organic groups when oil resistance is demanded.

The siloxane skeleton may be either straight or branched. In order to improve mechanical characteristics of a cured product, it is recommended to use a mixture of a straight chain organopolysiloxane and a branched organopolysiloxane. In this case, it is preferable, for assuring improved mechanical strength and improved modulus of elasticity, that the mixture as component (A) comprises (a) from 2 to 50% by weight of a branched organopolysiloxane comprising $R_3SiO_{1/2}$ units, $SiO_2$ units and, if desired, $R_2SiO$ units (wherein R represents the above-described organic group, at least 2 and preferably 3 or more of which are monovalent aliphatic unsaturated hydrocarbon groups) and (b) the balance of a diorganopolysiloxane with its both ends terminated with a monovalent aliphatic unsaturated hydrocarbon group.

While the degree of polymerization of component (A) is not particularly critical, an organopolysiloxane having a viscosity between 500 and 500,000 cSt, especially from 1,000 to 100,000 cSt, at 25° C. is preferred for assuring satisfactory fluidity and workability before curing and providing a cured product having moderate elasticity.

The organopolyhydrogensiloxane as component (B) functions as a crosslinking agent for component (A) to provide a cured product having a network structure in such a way that the hydrosilyl group thereof is added to the monovalent aliphatic unsaturated hydrocarbon group of component (A). To this effect, component (B) contains at least three hydrogen atoms bonded to the silicon atoms which participate in the addition reaction in the molecule thereof.

The organic group bonded to the silicon atom per siloxane unit includes the same organic groups, except the monovalent aliphatic unsaturated hydrocarbon groups, as enumerated above with reference to component (A). From the standpoint of ease of synthesis, a methyl group is the most preferred.

The siloxane skeleton of component (B) may be straight, branched or cyclic. A mixture of these skeletons may also be used.

Specific examples of component (B) include a straight chain organopolyhydrogensiloxane represented by formula (I):

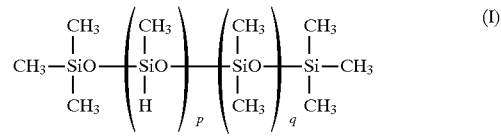

wherein p represents an integer of from 3 to 100; and q represents 0 or an integer of from 1 to 100, a straight chain organopolyhydrogensiloxane represented by formula (II):

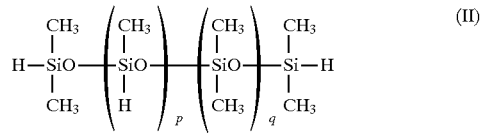

wherein p represents an integer of from 1 to 100; and q represents 0 or an integer of from 1 to 100, and branched organopolyhydrogensiloxanes comprising $(CH_3)_2HSiO_{1/2}$ units and $SiO_2$ units.

Component (B) is used in such an amount that the ratio of the hydrogen atoms bonded to the silicon atoms in component (B) to the monovalent aliphatic unsaturated hydrocarbon groups in component (A) is from 0.25 to 8, and preferably from 0.3 to 4. If this ratio is less than 0.25, sufficient curing reaction does not occur, failing to obtain desired physical properties. If it exceeds 8, the composition tends to cause foaming on curing, and the resulting cured product tends to have reduced heat resistance. It is desirable that component (B) has excellent compatibility with component (A).

Component (C) selected from the group consisting of platinum and platinum compounds is a catalyst for accelerating the addition reaction between the monovalent aliphatic unsaturated hydrocarbon groups in component (A) and the hydrosilyl groups in component (B).

Examples of suitable catalysts include metallic platinum (platinum black), chloroplatinic acid, a platinum-olefin complex, a complex obtained from platinum and an alcohol, a platinum-vinylsiloxane complex, and other platinum coordination compounds. Simple platinum supported on a carrier, e.g., alumina or silica, may also be used. In using chloroplatinic acid or a platinum-olefin complex, it is preferably supplied as dissolved in an alcohol, a ketone, an ether, a hydrocarbon, etc. A solid catalyst should be finely ground for assuring satisfactory dispersibility. Likewise, the carrier, if used, preferably has a small particle size and a large specific area.

Component (C) is preferably used in an amount of from 0.1 to 500 ppm in terms of platinum based on the weight of component (A). If the amount of component (C) is less than 0.1 ppm, the catalyzing effect is insubstantial. If it exceeds 500 ppm, no further improvement in, for example, rate of curing cannot be expected.

The oil-absorbing filler as component (D) is (a) a porous filler having been previously impregnated with from 1% by weight based on the weight of the porous filler up to a saturation amount of (b) a volatile organic compound incompatible or partly compatible with component (A) and compatible with an organic oily substance contaminating a substrate.

The saturation amount, i.e., the highest possible amount to be impregnated, is determined as follows. Volatile organic compound (b) is gradually added to a given amount of porous filler (a) with stirring by means of a tool, e.g., a spatula. At the point when filler (a) is agglomerated into masses, the amount of component (b) so far added is measured, which is divided by the sum of the added amount of component (b) and the given amount of component (a) to give a saturation amount in terms of percent by weight. While a saturation amount is generally decided by a combination of components (a) and (b), it is liable to variation on account of differences in characteristics of the components, especially component (a), depending on the kind or the grade. It is therefore necessary to determine a saturation amount for every kind or lot.

In preparation of component (D), no special means is needed for impregnation of component (a) with component (b). For example, impregnation may be carried out according to the above-described addition method as used in the measurement of a saturation amount or by a method comprising immersing component (a) in component (b), followed by filtration. The latter method is conveniently carried out by putting component (a) and a sufficient amount of component (b) for giving a thorough soak to component (a) into a sealed container, allowing the mixture to stand for a period necessary to reach to saturation (about 1 day), and separating impregnated component (a) by filtration.

The organic oily substance absorption of the composition can be controlled by not only the proportion of component (D) in the composition but also the pickup (degree of impregnation) of component (b) in component (D). Accordingly, it is necessary to vary the pickup of component (b) depending on the degree of oil contamination of an adherend substrate. In this case, component (b) is added to component (a) in an amount appropriately selected within the saturation amount. In order to conduct uniform impregnation, it is recommended that component (b) is once absorbed into component (a) to saturation by the immersion method and then excess of component (b) is removed through volatilization under stirring with an appropriate means.

Volatile organic compound (b) is absorbed in and adsorbed on porous filler (a) thereby functioning to prevent the oil absorption sites (pores) of the filler from being filled up with silicone oil, etc. during preservation. The volatile organic compound preferably has a boiling point of from 50° to 200° C. It is required therefore that the organic compound should be incompatible or partly compatible with component (A) and compatible with organic oily substances contaminating the surface of a substrate. Specific examples of such a volatile organic compound include ketones, e.g., acetone, methyl ethyl ketone, and methyl isobutyl ketone; ketoximes, e.g., diethyl ketoxime, methyl ethyl ketoxime, and methyl isobutyl ketoxime; ethers, e.g., dioxane and tetrahydrofuran; esters, e.g., methyl acetate, ethyl acetate, propyl acetate, and butyl acetate; and hydrocarbons, e.g., benzene, toluene, xylene, n-hexane, cyclohexane, and n-heptane. Preferred of them are methyl ethyl ketone, diethyl ketoxime, methyl ethyl ketoxime, methyl isobutyl ketoxime, propyl acetate, and n-heptane. These compounds may be used either individually or in combination of two or more thereof.

Porous filler (a) is a component capable of absorbing oily substances on a substrate and thereby contributing to development of adhesion to an oil-contaminated surface. The filler must be porous to this effect and preferably has high oil absorbability. Specific examples of such an oil-absorbing filler include diatomaceous earth, precipitated calcium carbonate, ground calcium carbonate, alumina, talc, silica gel, mica, titanium oxide, lithopone, zinc white, clay, kaolin, glass powder, gypsum, ground silica, dolomite, slate flour, barium sulfate, amorphous silica, perlite powder, talc powder, cellulose powder, calcium silicate, magnesium silicate, and zeolite. These fillers may be used either individually or in combination of two or more thereof. Preferred of them are diatomaceous earth, porous calcium carbonate, cellulose powder, zeolite, and silica gel for their effects on development of adhesion to an oil-contaminated surface.

A compounding ratio of components (a) and (b) is such that the amount of component (b) is from 1% by weight based on the weight of component (a) up to a saturation amount. In general, from 1 to 200 parts by weight of component (b) is used per 100 parts by weight of component (a).

The amount of component (D) in the composition ranges from 1 to 650 parts, and preferably from 2 to 400 parts, by weight per 100 parts by weight of component (A). If it is less than 1 part, no effect of developing adhesion is produced. If it exceeds 650 parts, a cured rubbery product of the composition has reduced mechanical characteristics.

In addition to the essential components (A) to (D), the composition of the present invention usually contains inorganic fillers for the purpose of imparting mechanical strength or hardness to a cured rubbery product. Inorganic fillers known in the art, such as fumed silica, precipitated silica, carbon black, graphite, metal powders, and metal oxides, can be used. These inorganic fillers may be used either individually or in combination thereof. They may be used either as such or with their surface treated with an organosilicon compound, e.g., dimethyl polysiloxane, octamethylcyclotetrasiloxane or hexamethyldisilazane.

While varying depending the kind of the filler or the end use of the composition, the filler is usually added in an amount of 150 parts by weight or less per 100 parts by weight of component (A). If the amount of the filler exceeds 150 parts, the composition is not easy to handle before curing, and the resulting cured product does not have sufficient mechanical properties.

If desired, the composition may further contain adhesion improving agents, oil diluents or oil repellents.

The composition of the present invention is usually supplied as a mixture of components (A) and (B) and a mixture of components (A) and (C) preserved in separate containers. The two mixtures are uniformly mixed immediately before use. Component (D), inorganic fillers, and other optional components are incorporated into either one or both of the two mixtures. In some cases, the whole proportion of component (A) may be present in one of the mixtures. Further, all the components including (A) to (D) and other necessary additives may be preserved in one container by addition of a proper reaction retarder or by proper selection of the kind and the amount of component (C).

The composition applied to a substrate rapidly cures on heating to develop adhesion to the substrate even with its surface contaminated with organic oily substances. Therefore, the composition serves as an adhesive for an oil-contaminated surface in such a manner that it is applied to one of adherends, and another adherend is bonded thereon while the composition is uncured, followed by heating (wet process) or the applied composition is once cured by heating and the another adherend is contact bonded thereto (dry process).

Containing component (D), the composition exhibits excellent adhesion durability to a substrate wetted with hydrocarbon oils (e.g., a rust preventing oil and an engine oil) or other organic oily substances.

The composition of the present invention is particularly effective as an FIPG sealing compound. In this application, a substrate having an organic oily substance-contaminated surface may be perfectly sealed by FIPG sealing operation without previously cleaning the contaminated substrate surface with a cloth, etc. As a result, the substrate cleaning operation can be omitted, making a great contribution to rationalization of production of engines, etc.

The present invention will now be illustrated in greater detail with reference to Examples, but the present invention should not be construed as being limited thereto. All the parts and percents are by weight unless otherwise indicated.

EXAMPLE 1

100 Parts of dimethyl polysiloxane with the both ends thereof terminated with a dimethylvinylsilyl group and having a viscosity of 2,000 cSt at 25° C., 11 parts of fumed silica (specific surface area: about 200 m²/g) having been surface-treated with dimethyldichlorosilane, 15.5 parts of diatomaceous earth (amorphous; average particle size: 40 μm) as component (D)-(a) having been impregnated with 25 parts (corresponding to 92% of a saturation amount, 27.1 parts) of methyl ethyl ketoxime as component (D)-(b), and 0.01 part of a complex prepared from chloroplatinic acid and tetramethyldivinylsiloxane (platinum content: 1.9%) were uniformly kneaded. To the mixture was then added 1.8 parts of polymethylhydrogensiloxane having its both ends terminated with a trimethylsilyl group and the middle portion thereof comprising 50 mol % of a methylhydrogensiloxane unit and 50 mol % of dimethylsiloxane unit and having a viscosity of 100 cSt at 25° C., followed by kneading to obtain a curable organopolysiloxane composition.

An engine oil (SAE viscosity number: 5W-30) was applied to each of an aluminum substrate and a steel substrate both having a length of 8 cm, a width of 2.5 cm, and a thickness of 0.2 cm at a spread of 0.05 g/surface. The two substrates were bonded together via the above-prepared organopolysiloxane composition with the oil-applied surfaces facing to each other to prepare a test specimen for a shearing adhesion test as shown in FIG. 1. After curing in an oven at 120° C. for 1 hour, the specimen was subjected to a shearing adhesion test at a pulling speed of 50 mm/min to obtain a shearing adhesive strength (LSS) and a percentage cohesive failure (CF). The results obtained are shown in Table 1. The results of the same test conducted using non-contaminated substrates are also shown in Table 1.

EXAMPLE 2 AND COMPARATIVE EXAMPLES 1 TO 3

A curable organopolysiloxane composition was prepared in the same manner as in Example 1, except for using components (D)-(a) and -(b) as shown in Table 1. That is, in Example 2, diatomaceous earth as used in Example 1 was replaced with zeolite (amorphous; average particle size: 4 μm), and methyl ethyl ketoxime as used in Example 1 was replaced with methyl ethyl ketone. Neither component (D)-(a) nor component (D)-(b) was used in Comparative Example 1. Either one of components (D)-(a) and -(b) was used in Comparative Examples 2 and 3.

Test specimens were prepared using these compositions and tested in the same manner as in Example 1. The results obtained are shown in Table 1.

TABLE 1

| Example No. | (D)-(a) Component Kind | Amount (part) | (D)-(b) Component Kind | Amount (part) | 5W-30 Oil-Applied LSS (kgf/cm²) | CF (%) | Non-Oil-Applied LSS (kgf/cm²) | CF (%) |
|---|---|---|---|---|---|---|---|---|
| Example 1 | Diatomaceous earth | 15.5 | Methyl ethyl ketoxime | 25 | 20.3 | 100 | 21.4 | 100 |
| Example 2 | Zeolite | 10 | Methyl ethyl ketone | 20* | 19.2 | 100 | 19.6 | 100 |
| Comparative Example 1 | — | — | — | — | Unmeasurable | 0 | 16.1 | 100 |
| Comparative Example 2 | Diatomaceous earth | 15.5 | — | — | 10.4 | 20 | 17.8 | 100 |
| Comparative Example 3 | — | — | Methyl ethyl ketoxime | 25 | 9.3 | 60 | 11.7 | 100 |

Note: *Corresponding to 40% of a saturation amount, 50.0 parts.

EXAMPLE 3

100 Parts of dimethyl polysiloxane with the both ends thereof terminated with a dimethylvinylsilyl group and having a viscosity of 5,000 cSt at 25° C., 18 parts of fumed silica (specific surface area: about 200 m²/g) having been surface-treated with dimethyl polysiloxane, 20 parts of diatomaceous earth (amorphous; average particle size: 20 μm) as component (D)-(a) having been impregnated with 25 parts (corresponding to 83% of a saturation amount, 30 parts) of propyl acetate as component (D)-(b), and 0.06 part of a complex prepared by heating chloroplatinic acid and 2-ethylhexanol (platinum content: 0.7%) were uniformly kneaded. To the mixture were then added 2.5 parts of polymethylhydrogensiloxane having its both ends terminated with a dimethylhydrogensilyl group and the middle portion thereof comprising 23 mol % of a methylhydrogensiloxane unit and 77 mol % of dimethylsiloxane unit and having a viscosity of 80 cSt at 25° C. and 0.8 part of vinyltriethoxysilane, followed by kneading to prepare a curable organopolysiloxane composition.

Eight test specimens were prepared using the resulting composition and aged in the same manner as in Example 1. Half of the specimens were dipped in an engine oil (SAE viscosity number: 10W-30) at 120° C. for 10 days for accelerated deterioration, and the other half were not. Each of the specimens was tested in the same manner as in Example 1. The results obtained were averaged and are shown in Table 2 below.

TABLE 2

| | Adhesion | | | | | | | |
|---|---|---|---|---|---|---|---|---|
| | Non-Treated with 10W-30 Oil | | | | Deteriorated with 10W-30 Oil | | | |
| | 5W-30 Oil-Applied | | Oil-Non-Applied | | 5W-30 Oil-Applied | | Oil-Non-Applied | |
| Example No. | LSS (kgf/cm$^2$) | CF (%) | LSS (kgf/cm$^2$) | CF (%) | LSS (kgf/cm$^2$) | CF (%) | LSS (kgf/cm$^2$) | CF (%) |
| Example 3 | 21.8 | 100 | 21.9 | 100 | 18.9 | 90 | 19.9 | 95 |

EXAMPLE 4

100 Parts of dimethyl polysiloxane with the both ends thereof terminated with a dimethylvinylsilyl group and having a viscosity of 3,000 cSt at 25° C., 13.5 parts of fumed silica (specific surface area: about 180 m$^2$/g) having been surface-treated with hexamethyldisilazane, 25.5 parts of calcium carbonate (needle-like and porous; average particle size: 2.3 μm) having been impregnated with 19.2 parts (corresponding to 60% of a saturation amount, 32 parts) of n-heptane, and 0.04 part of a 1% isopropyl alcohol solution of chloroplatinic acid were uniformly kneaded. To the mixture were added 2 parts of polymethylhydrogensiloxane having its both ends terminated with a trimethylsilyl group and the middle portion thereof comprising 56 mol % of a methylhydrogensiloxane unit and 44 mol % of dimethylsiloxane unit and having a viscosity of 40 cSt at 25° C. and 1.3 parts of methacryloxypropyltrimethoxysilane, followed by kneading to prepare a curable organopolysiloxane composition.

Test specimens were prepared using the resulting composition in the same manner as in Example 3 and tested in the same manner as in Example 3. The results obtained are shown in Table 3 below.

TABLE 3

| | Adhesion | | | | | | | |
|---|---|---|---|---|---|---|---|---|
| | 5W-30 Oil-Applied | | Oil-Non-Applied | | 5W-30 Oil-Applied | | Oil-Non-Applied | |
| Example No. | LSS (kgf/cm$^2$) | CF (%) | LSS (kgf/cm$^2$) | CF (%) | LSS (kgf/cm$^2$) | CF (%) | LSS (kgf/cm$^2$) | CF (%) |
| Example 4 | 21.3 | 100 | 21.7 | 100 | 19.4 | 85 | 20.5 | 95 |

While the invention has been described in detail and with reference to specific examples thereof, it will be apparent to one skilled in the art that various changes and modifications can be made therein without departing from the spirit and scope thereof.

What is claimed is:

1. A curable organopolysiloxane composition exhibiting good adhesion to a substrate where the surface of the substrate is contaminated with an organic oily substance, said composition comprising
   (A) 100 parts by weight of a liquid organopolysiloxane having at least two monovalent aliphatic unsaturated hydrocarbon groups bonded to the silicon atoms per molecule,
   (B) A liquid organopolyhydrogensiloxane having at least three hydrogen atoms bonded to the silicon atoms per molecule in such an amount that the number of the hydrogen atoms bonded to the silicon atoms falls within a range of from 0.25 to 8 per monovalent aliphatic unsaturated hydrocarbon group in component (A),
   (C) a catalyst selected from the group consisting of platinum and platinum compounds in an amount of from 0.1 to 500 ppm in terms of metallic platinum based on the weight of component (A), and (D) from 1 to 650 parts by weight of an oil-absorbing filler which has been prepared by impregnating (a) at least one porous filler with from 1% by weight based on the weight of said porous filler up to a saturation amount of (b) a volatile organic compound which is incompatible or partly compatible with component (A) and compatible with an organic oily substance.

2. A curable organopolysiloxane composition as claimed in claim 1, wherein said porous filler (a) is diatomaoeous earth, precipitated calcium carbonate, ground calcium carbonate cellulose powder, zeolite or silicon gel.

3. A curable organopolysiloxane composition as claimed in claim 1, wherein said volatile organic compound (b) is methyl ethyl ketone, diethyl ketoxime, methyl ethyl ketoxime, methyl isobutyl ketoxime, propyl acetate or n-heptane.

4. A curable organopolysiloxane composition as claimed in claim 1, wherein said volatile organic compound (b) is methyl ethyl ketoxime and the porous filler (a) is diatomaceous earth.

5. A curable organopolysiloxane composition as claimed in claim 1, wherein said impregnating is accomplished gradually adding the volatile organic compound (b) to the porous filler (a) with stirring or by immersing the porous filler (a) in the volatile organic compound (b) followed by filtration.

6. A curable organopolysiloxane composition as claimed in claim 5, wherein said immersing followed by filtration comprises soaking porous filler (a) in volatile organic compound (b) for a period of time sufficient to reach saturation and then separating the impregnated filler (a) by filtration.

* * * * *